(12) United States Patent
Hong

(10) Patent No.: US 10,180,668 B2
(45) Date of Patent: Jan. 15, 2019

(54) METHOD AND SYSTEM FOR MANAGING POWER

(71) Applicant: INDUSTRY-UNIVERSITY COOPERATION FOUNDATION HANYANG UNIVERSITY ERICA CAMPUS, Ansan-si, Gyeonggi-do (KR)

(72) Inventor: Seung-Ho Hong, Seoul (KR)

(73) Assignee: INDUSTRY-UNIVERSITY COOPERATION FOUNDATION HANYANG UNIVERSITY ERICA CAMPUS, Ansan-si, Gyeonggi-Do (KR)

(*) Notice: Subject to any disclaimer, the term of this patent is extended or adjusted under 35 U.S.C. 154(b) by 224 days.

(21) Appl. No.: 15/034,554

(22) PCT Filed: Nov. 7, 2014

(86) PCT No.: PCT/KR2014/010680
§ 371 (c)(1),
(2) Date: May 5, 2016

(87) PCT Pub. No.: WO2015/069056
PCT Pub. Date: May 14, 2015

(65) Prior Publication Data
US 2016/0291554 A1 Oct. 6, 2016

(30) Foreign Application Priority Data

Nov. 8, 2013 (KR) .................. 10-2013-0135112
Oct. 28, 2014 (KR) .................. 10-2014-0147756

(51) Int. Cl.
*G05B 13/04* (2006.01)
*G06Q 10/10* (2012.01)
(Continued)

(52) U.S. Cl.
CPC ....... *G05B 13/042* (2013.01); *G06Q 10/1097* (2013.01); *G06Q 50/06* (2013.01);
(Continued)

(58) Field of Classification Search
CPC .. G06Q 50/06; H02J 3/008; H02J 3/28; H02J 13/0006
(Continued)

(56) References Cited

U.S. PATENT DOCUMENTS

2013/0138285 A1* 5/2013 Bozchalui ............ G06Q 10/04
701/22
2013/0338842 A1 12/2013 Inoue et al.
(Continued)

FOREIGN PATENT DOCUMENTS

JP H10-31504 A 2/1998
KR 10-2012-0097551 A 9/2012
(Continued)

*Primary Examiner* — Changhyun Yi
(74) *Attorney, Agent, or Firm* — Rabin & Berdo, P.C.

(57) ABSTRACT

A method and a system for managing power are provided. The method for managing power includes: calculating in-facility DERs based on price data; and modeling a task of a production process in an industrial facility so as to minimize an energy cost by reflecting the calculated in-facility DERs, and controls charging/discharging of an energy storage system and production electricity of an energy generation system, and selects an operating point of a schedulable task of the production process so as to minimize the energy cost according to a change in the price data.

11 Claims, 12 Drawing Sheets

(51) Int. Cl.
*G06Q 50/06* (2012.01)
*H02J 3/00* (2006.01)
*H02J 3/38* (2006.01)
*H02J 3/14* (2006.01)

(52) U.S. Cl.
CPC .............. *H02J 3/005* (2013.01); *H02J 3/381* (2013.01); *H02J 2003/003* (2013.01); *H02J 2003/007* (2013.01); *H02J 2003/146* (2013.01); *Y02P 80/11* (2015.11)

(58) Field of Classification Search
USPC ........................................................ 700/291
See application file for complete search history.

(56) References Cited

U.S. PATENT DOCUMENTS

2014/0039709 A1* 2/2014 Steven ................... G06Q 10/06
  700/291
2016/0028231 A1* 1/2016 Kamel ................ H02J 13/0006
  700/287

FOREIGN PATENT DOCUMENTS

KR  10-2013-0034395 A  4/2013
WO  WO-2012118067 A1  9/2012

* cited by examiner

FIG. 11

| Time Interval | OGS #2 | OGS #3 | OGS #4 | WCS #1 | WCS #2 | WCS #3 |
|---|---|---|---|---|---|---|
| 0 | 1 | 8 | 1 | 3 | 1 | 3 |
| 1 | 1 | 1 | 8 | 3 | 1 | 3 |
| 2 | 8 | 1 | 1 | 3 | 3 | 3 |
| 3 | 8 | 8 | 8 | 3 | 3 | 3 |
| 4 | 1 | 7 | 7 | 3 | 3 | 3 |
| 5 | 1 | 1 | 1 | 1 | 3 | 1 |
| 6 | 8 | 8 | 1 | 3 | 3 | 3 |
| 7 | 8 | 1 | 1 | 3 | 1 | 3 |
| 8 | 1 | 8 | 1 | 3 | 2 | 1 |
| 9 | 1 | 8 | 1 | 3 | 3 | 1 |
| 10 | 1 | 1 | 8 | 3 | 3 | 1 |
| 11 | 1 | 8 | 1 | 1 | 2 | 3 |
| 12 | 8 | 1 | 1 | 3 | 3 | 1 |
| 13 | 8 | 1 | 1 | 1 | 3 | 3 |
| 14 | 4 | 1 | 1 | 3 | 2 | 1 |
| 15 | 1 | 1 | 1 | 1 | 1 | 1 |
| 16 | 1 | 1 | 1 | 1 | 1 | 1 |
| 17 | 1 | 8 | 1 | 1 | 3 | 3 |
| 18 | 8 | 1 | 1 | 1 | 3 | 2 |
| 19 | 8 | 1 | 1 | 3 | 1 | 3 |
| 20 | 1 | 8 | 1 | 3 | 3 | 1 |
| 21 | 1 | 8 | 1 | 3 | 3 | 1 |
| 22 | 1 | 8 | 1 | 3 | 3 | 1 |
| 23 | 1 | 8 | 1 | 3 | 1 | 2 |

METHOD AND SYSTEM FOR MANAGING POWER

TECHNICAL FIELD

The present invention relates to a method and a system for managing power, which can apply a smart grid system to an industrial facility and manage electricity demands in a production process of the industrial facility so as to minimize the operating costs of the industrial facility.

BACKGROUND ART

The smart grid technologies are selected in many countries as a next-generation core business and are actively being researched. The smart grid system aims at reducing electricity consumption and uses a method of turning on/off a specific device to reduce electricity consumption, as disclosed in Korean Patent Publication No. 2012-0097551. However, the related-art smart grid system has not proposed an appropriate method of distributing supplied energy to effectively use the energy.

In addition, a power outage frequently occurs. This is because many people use energy at a particular time. Therefore, there is a need for a method for reducing energy consumption by people at the particular time, but such a method does not exist.

DISCLOSURE

Technical Problem

The present invention provides a method and system for managing power, which can apply a smart grid system to an industrial facility and manage electricity demands in a production process to minimize the operating costs of the industrial facility.

Technical Solution

According to an aspect of the present invention, there is provided a method for managing electricity demands in a production process to minimize the operating costs of an industrial facility by applying a smart grid system to the industrial facility.

To achieve this, the method for managing power according to the present includes: calculating in-facility DERs based on price data; and modeling a task of a production process in an industrial facility so as to minimize an energy cost by reflecting the calculated in-facility DERs.

In addition, a system for managing power according to the present invention includes: an industrial facility which has a production process including at least one task for producing a production material by consuming a consumption material; and an energy management system which is configured to calculate electricity based on price data, and model the task of the production process so as to minimize an energy cost by reflecting the calculated electricity.

In addition, a method for managing power according to the present invention includes: modeling in-facility DERs based on price data; modeling a schedulable task in which an electricity demand is scheduled from among tasks which are processing operations performed in a production process of an industrial facility; and managing the electricity demand by selecting an operating point of the modeled schedulable task so as to minimize an energy cost by reflecting the modeled in-facility DERs.

In addition, an energy management system according to the present invention includes: a resource modeling unit configured to model in-facility DERs based on price data; a task modeling unit configured to model a task which is a processing operation performed in a production process of an industrial facility; and a resource management unit configured to manage an electricity demand by selecting an operating point of the modeled task so as to minimize an energy cost by reflecting the modeled in-facility DERs.

Advantageous Effects

The method and system for managing power according to an exemplary embodiment of the present invention are provided to apply the smart grid system to industrial facilities and manage the electricity demand of the production process to minimize the operating cost of the industrial facilities.

DESCRIPTION OF DRAWINGS

FIG. 11 shows a table illustrating operating points during time intervals, according to the exemplary embodiment of the invention.

BEST MODE

Figure 1:
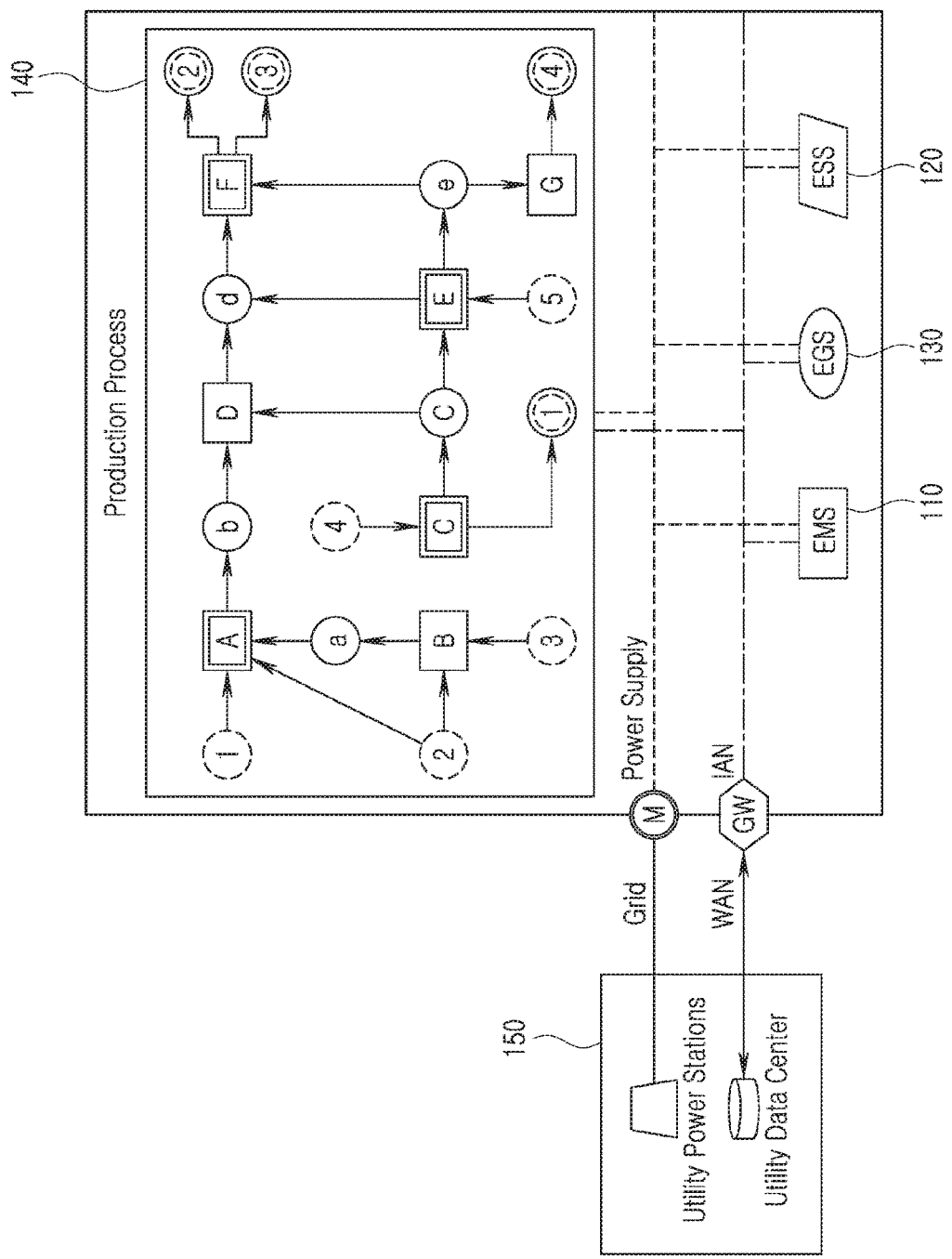
FIG. 1 is a block diagram schematically illustrating a configuration of a smart grid system of an industrial facility according to an exemplary embodiment of the present invention.

As the present invention allows for various changes and numerous embodiments, particular exemplary embodiments will be illustrated in the drawings and described in detail in the written description.

However, this is not intended to limit the present invention to particular embodiments, and it is to be appreciated that all changes, equivalents, or substitutes that do not depart from the spirit and technical scope of the present invention are encompassed in the present invention.

In the description of the present invention, certain detailed explanations of related art are omitted when it is deemed that they may unnecessarily obscure the essence of the inventive invention.

The terms such as "first" and "second" may be used to explain various elements, but the elements should not be limited by these terms. These terms may be used for the purpose of distinguishing one element from another element.

The terms used in the present application are used to explain specific embodiments and are not intended to limit the present invention. As used herein, the singular forms are intended to include the plural forms as well, unless the context clearly indicates otherwise.

The terms "include", "have," etc. used in present application indicate the presence of features, numbers, steps, operations, elements, parts described in the specification, or a combination thereof, and do not preclude the presence or addition of one or more other features, numbers, steps, operations, elements, parts, or a combination thereof.

Hereinafter, exemplary embodiments of the present invention will be explained in detail with reference to the accompanying drawings.

FIG. 1 is a view schematically showing a smart grid system of an industrial facility according to the present invention.

The smart grid system of the industrial facility shown in FIG. 1 manages electricity in response to an electricity demand for a production process 140 in the industrial facility such as steel, cement, paper productions, etc.

The production process 140 may produce an intermediate product or a final product by performing a specified task using feed or an intermediate product, and each of the tasks may include a plurality of operations.

In FIG. 1, the feed or intermediate product or the intermediate product or final product made using the feed or intermediate product are expressed by circles. Dashed circles 1, 2, 3, and 4 indicate the feed, solid circles a, b, c, d, and e indicate the intermediate products, and solid circles having dashed circles therein 1, 2, 3, and 4 indicate the final products.

In addition, the task indicates a processing operation and is expressed by rectangles. The task includes a non-schedulable task (NST) and a schedulable task (ST). Double-border rectangles indicate NSTs A, C, E, and F, and single-border rectangles indicate STs B, D, and G.

The NST is a task where the demand cannot be scheduled and must be satisfied immediately no matter whether the electricity price is high or low, and the ST is a task where the demand can be scheduled. Examples of the NST include a blast furnace task in steel manufacturing and an assembly task in automobile manufacturing processes. Examples of the ST include water heating/cooling and packaging tasks.

The smart grid system of the industrial facility may manage energy in such a manner that each task of the production process consumes much electricity when the unit price is relatively low, and consumes less electricity when the unit price is relatively high based on the unit price provided by a utility supplier 150.

Herein, the unit price may be provided by the utility supplier in each time interval when the price for using electricity is changed, and price data including the unit price for using electricity in each time interval may be provided.

For the sake of easy understanding and easy explanation, it is assumed that the unit price for using electricity is changed in each time interval in the present specification.

The smart grid system according to an exemplary embodiment of the present invention may manage an electricity demand of each task in the production process to minimize the operating costs while satisfying the market demand.

As shown in FIG. 1, the smart grid system of the industrial facility may include an Energy Management System (EMS) 110, an Energy Storage System (ESS) 120, and an Energy Generation System (EGS) 130.

The EMS 110 may be provided with price data on the unit price by the utility supplier 150, and may store the price data. In the state in which the EMS 110 is provided with a state-task network (STN) on the production process 140 of the industrial facility and stores the STN, the EMS 110 may model each task of the production process 140 to satisfy the market demand, model in-facility Distributed Energy Resources (DERs) based on the price data, and then manage the electricity demand of the production process by selecting an operating point of each of the modeled tasks to minimize the cost by reflecting the modeled in-facility DERs.

Herein, the STN includes a task node and a state node. The task node represents a processing operation and the state node represents feed, an intermediate product, and a final product.

The ESS 120 is a means for storing resources when the unit price is low and providing resources to the production process of the industrial facility when the unit price is high based on the price data.

The EGS 130 is a means for producing in-facility DERs and providing the same to the production process of the industrial facility.

Figure 2:
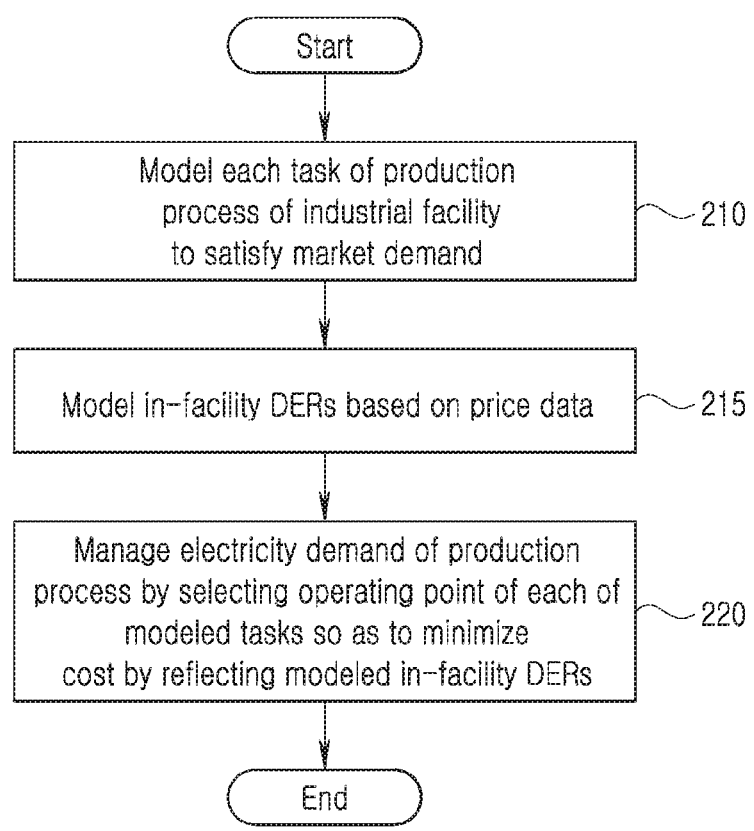
FIG. 2 is a sequence diagram illustrating a method for managing energy of an industrial facility according to an exemplary embodiment of the present invention.
Figure 3:
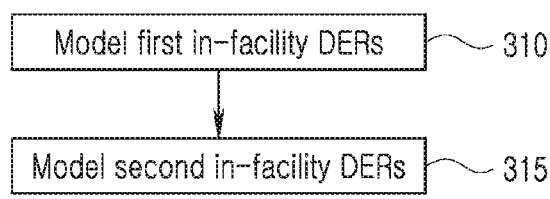
FIG. 3 is a sequence diagram showing modeling in-facility Distributed Energy Resources (DERs) according to an exemplary embodiment of the present invention.
Figure 4:
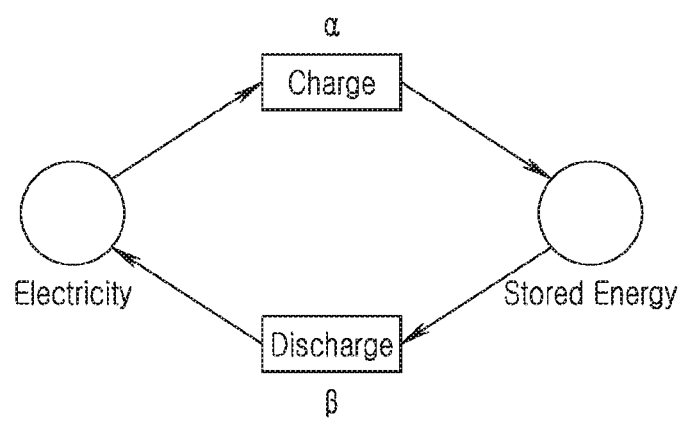
FIG. 4 is a view to illustrate charging and discharging in an Energy Storage System (ESS) according to an exemplary embodiment of the present invention.
Figure 5:
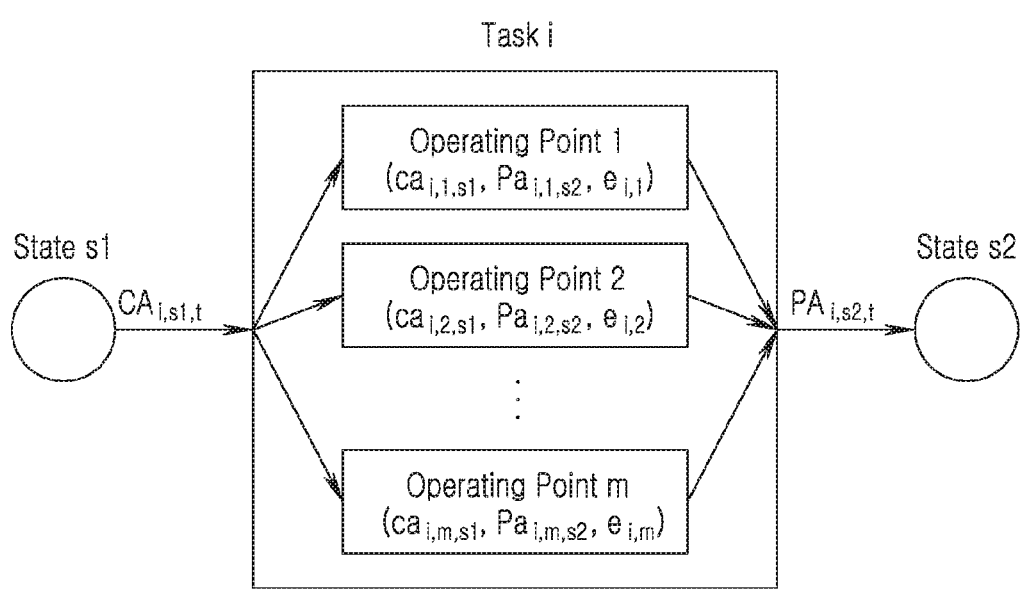
FIG. 5 is a view to illustrate operating points of a schedulable task according to an exemplary embodiment of the present invention.

FIG. 2 is a sequence diagram showing a method for managing energy for the production process of the industrial facility according to an exemplary embodiment of the present invention, FIG. 3 is a sequence diagram showing modeling in-facility DERs according to an exemplary embodiment of the present invention, FIG. 4 is a view to illustrate modeling first in-facility DERs according to an exemplary embodiment of the present invention, and FIG. 5 is a view to illustrate operating points of a schedulable task according to an exemplary embodiment of the present invention.

It is assumed that the EMS 110 is provided with the price data on the unit price by the utility supplier 150 and stores the price data, and is provided with the state-task network (STN) on the production process 140 and stores the STN.

In step 210, the EMS 110 models each task of the production process 140 to produce a final product satisfying the market demand.

More specifically, the EMS 110 may model each task of the production process 140 based on the price data. For example, the EMS 110 may model each task to consume much electricity in the production process 140 when the unit price for electricity in each time interval, which is provided by the utility supplier, is low, and may model each task to consume less electricity in the production process 140 when the unit price is high.

According to an exemplary embodiment of the present invention, the task refers to a processing operation which is performed in the production process 140.

Each task of the production process 140 is classified into a schedulable task (ST) and a non-schedulable task (NST).

The electricity demand consumed in the NST may be determined a priori at the start, but afterward may be predicted with reference to previous records in each time interval.

The ST may support a plurality of operating points as shown in FIG. 5, and the electricity demand consumed in each time interval on each operating point may be determined a priori.

According to an exemplary embodiment of the present invention, the operating point refers to a detailed processing operation which is set by considering a consumption material consumed in the task and a production material outputted from the task. The production process of the industrial facility includes a plurality of tasks, and it is determined which operating point will be driven in each schedulable task by considering the market demand, costs, etc.

As shown in FIG. 5, the ST may produce a production material by processing a consumption material on a certain operating point. The consumption material is expressed by input state (State s1) and the production material is expressed by output state (State s2). Herein, the consumption material is feed or an intermediate product which is consumed through the task to produce a production material, and the production material is an intermediate product or final product which is produced through the task by consuming a consumption material.

The electricity demands consumed on the plurality of operating points in the ST are different. Accordingly, quantities of input state (quantities of consumption materials) and quantities of output state (quantities of production materials) consumed on the respective operating points may be different.

That is, the plurality of operating points in the ST may produce more production materials by consuming more consumption materials as the electricity demand increases. On the other hand, the operating point that has low electricity demand may produce fewer production materials by consuming fewer consumption materials.

Accordingly, the EMS 110 may model the ST with reference to the price data and the market demand.

That is, the EMS 110 may model in such a manner that an operating point that has high electricity demand is selected and operated when the unit price is low, and an operating point that has low electricity demand is selected and operated when the unit price is relatively high. Accordingly, the EMS 110 may produce intermediate products requiring high electricity consumption in advance when the electricity price is low, and uses the pre-produced intermediate products when the electricity price is high, so that the total energy cost can be reduced.

In addition, only one of the plurality of operating points which support the ST according to an exemplary embodiment of the present invention may be selected.

Of course, a plurality of operating points may be selected from the plurality of operating points supporting the ST and operated according to an implementation method. However, in the present specification, it is assumed that each of the STs selects and operates one of the operating points for the sake of easy understanding and easy explanation.

To achieve this, the present invention proposes a generalized Demand Response (DR) algorithm to minimize the energy cost to industrial facilities by determining the optimal scheduling of STs and in-facility Distributed Energy Resources (DERs).

Figure 8:
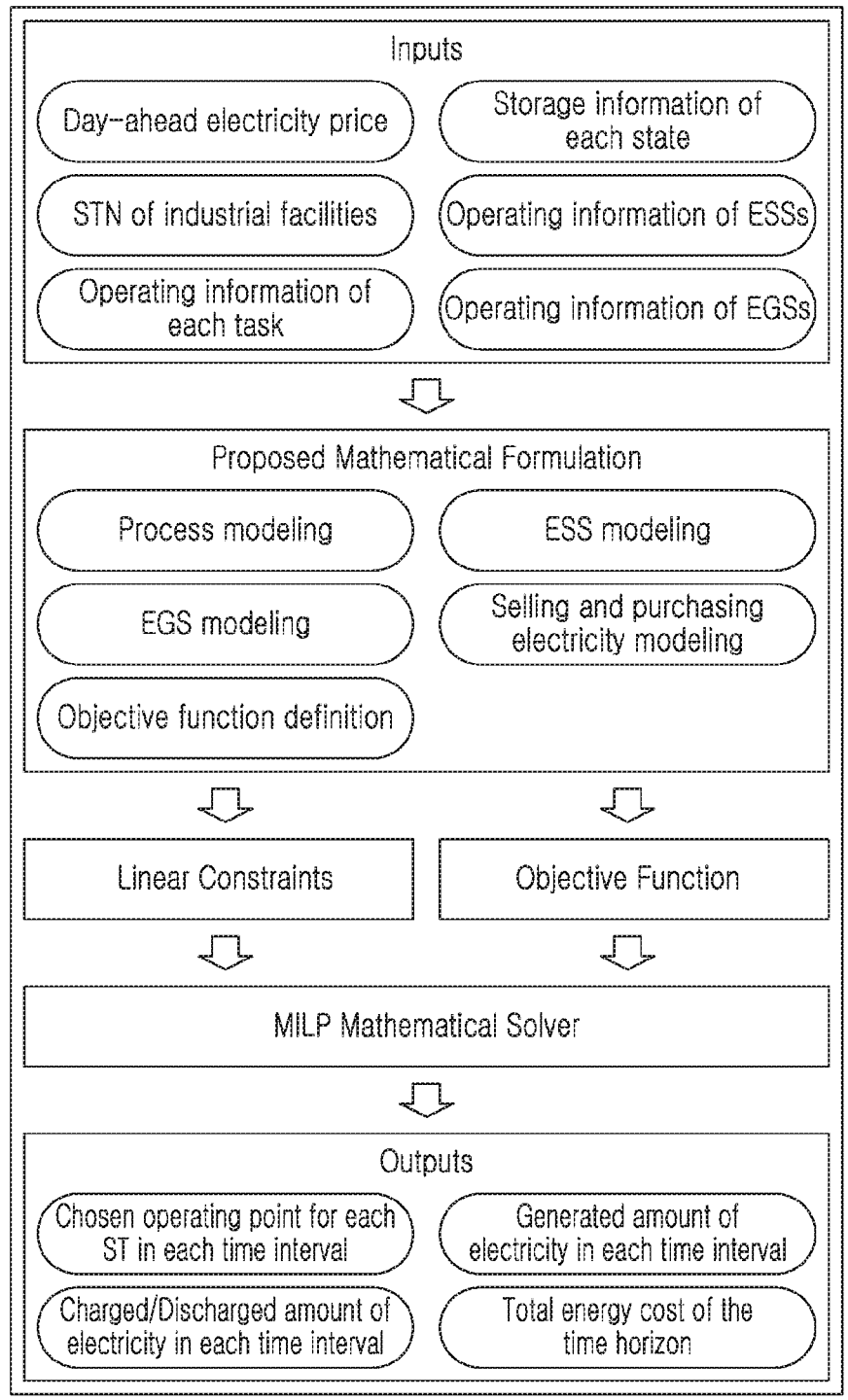
FIG. 8 is a view showing a concept of Mixed Integer Linear Programming (MILP).

The DR algorithm may be formulated using Mixed Integer Linear Programming (MILP) as shown in FIG. 8. The inputs include the unit prices (day-ahead hourly electricity price), the STN of the production process, operating data of each task (including supported operating points, consumption and production rate of related states, and electricity demand of each operating point), storage information of each state (including the initial storage amount of each state, and lower and upper storage requirements), operating information of the ESS (including energy storage capacity, maximum charging and discharging rate, and charging and discharging efficiency), and operating information of the EGS (including operating range and related cost to generate electricity).

All the inputs are formulated using MILP which includes an objective function and a series of constraints. The key characteristics of MILP are as follows:

(a) The decision variable can be both continuous and discrete.

(b) The objective function and the constraints must be linear.

The objective function is defined to minimize the energy cost to industrial facilities. The linear constraints are specified for the process, ESS, EGS, and selling or purchasing of electricity. The constraints for process modeling include the operating constraints, material balance constraints, electricity balance constraints, and storage constraints. The constraints for the ESS include the electricity balance constraints, capacity constraints, and charging/discharging constraints. Finally, there are constraints for the EGS and constraints for the selling/purchasing of electricity.

Once the MILP problem is solved, the operating point for the ST selected in each time interval, the charging/discharging rate of the ESS, the amount of electricity generated by the EGS, the amount of electricity purchased or sold, the total cost of the energy used by the industrial facility are calculated as the outputs.

The modeling for the ST of the production process 140 includes constraints for material balance, electricity balance, storage, and operation.

1) Material Balance

The material balance indicates that the storage ($S_{s,t}$) of each state s at time t is equal to the storage $S_{s,t-1}$ at time t−1 plus the total quantity of state s produced within time interval (t−1, t) minus the total quantity of state s consumed within time interval (t−1, t), as expressed in Equation 1a presented below:

$$S_{s,t} = S_{s,t-1} + \sum_{i \in PT_s} PA_{s,i,t-1} - \sum_{i \in CT_s} CA_{s,i,t-1} \qquad \text{Equation 1a}$$

$$\forall s, \forall t > 0$$

where $PA_{s,i,t-1}$ and $CA_{s,i,t-1}$ are the quantity of state s produced and consumed by task i within time interval (t−1, t).

2) Electricity Balance

The total electricity demand ($E_t$) during time interval (t, t+1) is equal to the sum of the electricity demand ($e_{i,t}$) of each task as expressed by Equation 1b presented below:

$$E_t = \sum_i e_{i,t} \; \forall i, \forall t \geq 0 \qquad \text{Equation 1b}$$

3) Storage Balance

To guarantee reliability of a production process, the storage ($S_{s,t}$) of each state must not be less than a minimum value ($LB_s$) or must not be greater than a maximum value ($UB_s$) as expressed by Equation 1c presented below:

$$LB_s \leq S_{s,t} \leq UB_s \, \forall s, \forall t > 0 \qquad \text{Equation 1c}$$

4) Operating Constraints

FIG. 5 illustrates task $ST_i$ which consumes state s1 and produces state s2, and supports M operating points. For each operating point m, the consumed quantity of state s1, $ca_{i,m,s1}$, the produced quantity of state s2, $pa_{i,m,s2}$, and the electricity demand, $e_{i,m}$, within a time interval are known a priori. Task i tends to reduce electricity consumption when the electricity price is high, and increase electricity consumption when the electricity price is low.

Each operating point of task i is associated with a binary variable $z_{i,m,t}$ during time interval (t, t+1). $Z_{i,m,t}=1$ if task i operates on operating point m during time interval (t, t+1), and $z_{i,m,t}=0$ otherwise. During each time interval, $ST_i$ only operates on one operating point according to constraint by Equation 1d presented below:

$$\sum_m z_{i,m,t} = 1 \; \forall t \geq \forall i \in ST \qquad \text{Equation 1d}$$

That is, only one $z_{i,m,t}$ of task i is equal to 1 during time interval (t, t+1) and all the others are equal to 0.

Accordingly, the electricity demand of task i during time interval (t, t+1) may be derived as expressed in Equation 1 presented below:

$$e_{i,t} = \sum_m z_{i,m,t} \cdot e_{i,m} \; \forall t \geq 0, \forall i \in ST \qquad \text{Equation 1}$$

where m indicates an operating point, $$\sum_m z_{i,m,t}$$

indicates an operating state of each operating point, and $e_{i,m}$ indicates the electricity demand of each operating point.

The quantity of consumption material consumed by task i during time interval (t, t+1) may be expressed as Equation 2 presented below, and the quantity of production material produced by task i may be expressed as Equation 3 presented below.

$$CA_{s,i,t} = \sum_m z_{i,m,t} \cdot ca_{i,m,s} \; \forall_{s,t} \geq 0, \forall i \in CT_s/ST \qquad \text{Equation 2}$$

$$PA_{s,i,t} = \sum_m z_{i,m,t} \cdot pa_{i,m,s} \; \forall_{s,t} \geq 0, \forall i \in PT_s/ST \qquad \text{Equation 3}$$

The EMS 110 may determine the quantity of consumption material and the quantity of production material with reference to the unit price so as to satisfy the market demand, may model each task of the production process to satisfy the determined quantities of consumption material and production material, and may derive the electricity demand necessary for each of the modeled tasks.

In step 215, the EMS 110 models the in-facility DERs based on the price data. Herein, the in-facility DERs include resources stored in the ESS 120 and resources generated in the EGS 130.

Hereinafter, the resources of the ESS will be referred to as first in-facility DERs, and the resources generated by the EGS will be referred to as second in-facility DERs for the sake of easy understanding and easy explanation.

Referring to FIG. 3, a method for modeling in-facility DERs will be explained in detail. In FIG. 3, the method of modeling the first in-facility DERs precedes for the sake of easy understanding and easy explanation, but the modeling of the first in-facility DERs and the modeling of the second in-facility DERs may be performed in parallel.

In step 310, the EMS 110 models the first in-facility DERs.

That is, the EMS 110 models the first in-facility DERs to store the resources in the ESS 120 when the unit price is low and provide the resources stored in the ESS 120 to the production process when the unit price is high based on the price data.

The modeling of the first in-facility DERs, that is, the ESS modeling, includes energy balance, charging/discharging constraints, and capacity constraints.

1) Energy Balance Constraints

The quantity of first in-facility DERs, that is, the quantity of resources ($S_{ESS,t}$) stored at time t is equal to the quantity of resources ($S_{ESS,t-1}$) stored at previous time t−1 plus the quantity of resources charged during current time interval (t−1, t) multiplied by charging efficiency ($\alpha$), minus the quantity of resources discharged during time interval (t, t−1) divided by discharging efficiency ($\beta$). This may be expressed by Equation 4 as presented below with reference to FIG. 4:

$$S_{ESS,t} = S_{ESS,t-1} + S_{CESS,t-1} \cdot \alpha - E_{DESS,t-1}/\beta \, \forall t > 0 \qquad \text{Equation 4}$$

where $\alpha$ indicates charging efficiency and $\beta$ indicates discharging efficiency, $E_{CESS,t-1}$ indicates the quantity of resources charged during time interval (t−1, t) and $E_{DESS,t-1}$ indicates the quantity of resources discharged during time interval (t−1, t).

2) Charging/Discharging Constraints

The ESS 120 does not charge (store) and discharge resources during the same time interval as expressed by Equation 4a presented below:

$$z_{c,t} + z_{d,t} \leq 1 \, \forall t \geq 0$$

where $z_{c,t}$ and $z_{d,t}$ are binary variables. $z_{c,t}=1$ if the ESS charges electricity during time interval (t, t+1), and $z_{c,t}=0$ otherwise. In addition, $z_{d,t}=1$ when the ESS discharges electricity during time interval (t, t+1) and $z_{d,t}=0$ otherwise.

The quantity of electricity charged and discharged during each time interval ($E_{CESS,t}$, $E_{DESS,t}$) is limited by the maximum charging rate ($CH_{SE}$) and the maximum discharging rate ($DCH_{SE}$). These may be expressed by Equation 5 and Equation 6 presented below:

$$0 \leq E_{CESS,t} \leq CH_{SE} \cdot z_{c,t} \forall t \geq 0 \quad \text{Equation 5}$$

where $z_{c,t}$ indicates a charging state and $CH_{SE}$ indicates the maximum charging rate.

$$0 \leq E_{DESS,t} \leq DCH_{SE} \cdot z_{d,t} \forall t \geq 0 \quad \text{Equation 6}$$

where $z_{d,t}$ indicates a discharging state and $DCH_{SE}$ indicates the maximum discharging rate.

In Equation 5, $E_{CESS,t}=0$ when $z_{c,t}=0$, and, in Equation 6, $E_{DESS,t}=0$ when $z_{d,t}=0$.

3) Capacity Constraints

As expressed in Equation 6a, the quantity of energy $S_{ESS,t}$ stored at each time cannot exceed the maximum storage capacity $C_{SE}$.

$$0 \leq S_{ESS,t} \leq C_{SE} \forall t \geq 0 \quad \text{Equation 6a}$$

That is, the EMS 110 may model to charge the resources in the ESS when the unit price is low and provide the resources stored in the ESS to the production process of the industrial facility when the unit price is high based on the price data. In this case, the maximum quantity of resources stored in the ESS is limited by storage capacity of the ESS. That is, the maximum quantity of resources stored in the ESS does not exceed the maximum storage capacity of the ESS.

In step 315, the EMS 110 models the second in-facility DERs, that is, the EGS.

According to an exemplary embodiment of the present invention, the second in-facility DERs are resources which are produced by the EGS 130, and are classified into non-schedulable production resources and schedulable production resources.

The non-schedulable production resources indicate resources which are produced by a non-schedulable energy generation system, such as solar, wind, waste heat power plants.

In addition, the schedulable production resources indicate resources which are produced by a schedulable energy generation system, such as diesel gas power plants.

In addition, the non-schedulable production resources may be predicted at each time and the schedulable production resources may be modeled by reflecting the price data. In this case, the non-schedulable production resources may be predicted at each time with reference to previous records.

In addition, the schedulable production resources may be modeled by taking into consideration the cost required to produce the schedulable production resources in comparison to the price data.

For example, the schedulable production resources may be controlled at each time by taking into consideration the cost required to produce the schedulable production resources based on the price data. For example, the schedulable production resources may be modeled not to be produced when the price data is very low. On the other hand, the schedulable production resources may be modeled to be produced up to the maximum production capacity when the price data is very high.

For example, it is assumed that the price data of the resources provided by the utility supplier 150 is very high and the electricity demand of the production process is high. In this case, when the cost required to produce the schedulable production resources is lower than the price data, modeling may be performed to produce more schedulable production resources.

According to an exemplary embodiment of the present invention, the schedulable production resources may be modeled by taking into consideration the first in-facility DERs. That is, when the price data is high, modeling may be performed to produce as many schedulable production resources as a shortage of the first in-facility DERs.

As described above, the second in-facility DERs are equal to the sum of the schedulable production resources and the non-schedulable production resources. This may be expressed by Equation 7 presented below:

$$E_{EGS,t}=E_{NEGS,t}+E_{SEGS,t} \forall t \geq 0 \quad \text{Equation 7}$$

Since the schedulable production resources accompany consumption of raw materials to produce resources, the quantity of produced schedulable production resources may be expressed by Equation 8 presented below:

$$S_{SEGS,t}=\gamma \cdot CR_t \forall t \geq 0 \quad \text{Equation 8}$$

where $CR_t$ indicates the quantity of raw material consumed to produce production resources periodically within time interval, and vindicates production efficiency.

In step 220, the EMS 110 may manage the electricity demand of the production process of the industrial facility by selecting an operating point of each of the modeled tasks to minimize the cost by reflecting the modeled in-facility DERs.

The smart grid technologies enable customers not only to purchase electricity from the utility supplier, but also to sell excess electricity back to the utility supplier if there is a surplus of electricity. Hereinafter, electricity selling and purchasing modeling will be explained.

According to an exemplary embodiment of the present invention, the electricity demand ($E_{DM,t}$) of the production process is derived using the electricity demand of each task, the first in-facility DERs, and the second in-facility DERs. This may be expressed by Equation 9 presented below:

$$E_{DM,t}=E_t+E_{CESS,t}-E_{DESS,t}-E_{EGS,t} \forall t \geq 0 \quad \text{Equation 9}$$

where $E_t$ indicates the electricity demand of each task, $E_{CESS,t}$ indicates charged first in-facility DERs, $E_{DESS,t}$ indicates discharged first in-facility DERs, and $E_{EGS,t}$ indicates second in-facility DERs.

If the electricity demand ($E_{DM,t}$) of the industrial facility is a positive value, the customers should purchase electricity from the utility supplier, and, if the electricity demand is a negative value, the customers can sell the excess electricity back to the utility supplier.

When the whole electricity demand of the industrial facility is not satisfied only by the first in-facility DERs and the second in-facility DERs, the EMS 110 may manage to fill the shortage through the utility supplier.

In addition, when there is a surplus of the first in-facility DERs and the second in-facility DERs in comparison to the whole electricity demand of the industrial facility, the EMS 110 may manage to sell the excess resources through the utility supplier.

In Equations 9a to 9c, $z_{p,t}=1$ if the industrial facility purchases electricity during time interval (t, t+1) and $z_{s,t}=1$ if it sells electricity during time interval (t, t+1). Herein, B is a big sufficient and positive number $$E_{DM,t} \leq z_{p,t} \cdot B \quad \forall t \geq 0 \quad \text{Equation 9a}$$

$$E_{DM,t} \leq z_{p,t} \cdot (-B) \forall t \geq 0 \quad \text{Equation 9b}$$

$$z_{p,t}+z_{s,t} \leq 1 \forall t \geq 0 \quad \text{Equation 9c}$$

When the in-facility DERs are insufficient to process all processes, $E_{DM,t}$ is positive so that Equation 9a forces $z_{p,t}=1$, Equation 9b is satisfied independently of $z_{s,t}$ and Equation 9c forces $z_{s,t}=0$. This indicates that the industrial facility purchases electricity from the utility supplier. When the in-facility DERs are surplus to the electricity demand of the industrial facility, $E_{DM,t}$ is negative. As B is a big sufficient and positive number, Equation 9a is satisfied independently of $z_{p,t}$, Equation 9b forces $z_{s,t}=1$, and Equation 9c forces $z_{p,t}=0$. This indicates that the industrial facility sells electricity to the utility supplier.

Table 1-1 shows the relationship between $E_{p,t}$, $E_{s,t}$ and $E_{DM,t}$.

TABLE 1-1

| Variable | $E_{DM,t}$ | $E_{p,t}$ | $E_{s,t}$ |
| --- | --- | --- | --- |
| Purchasing | ≥0 | $E_{DM,t}$ | 0 |
| Selling | <0 | 0 | $-E_{DM,t}$ |

$E_{p,t}$ and $E_{s,t}$ are the amount of electricity purchased and sold during time interval (t, t+1), respectively. When both values are not negative and $E_{p,t}=0$, no energy is purchased. When $E_{s,t}=0$, no energy is sold. When $E_{DM,t}$ is not negative and $E_{p,t}=E_{DM,t}$ and $E_{s,t}=0$, this indicates that the industrial facility purchases electricity from the utility supplier. When $E_{DM,t}$ is negative and $E_{p,t}=0$ and $E_{s,t}=-E_{DM,t}$, this indicates that the industrial facility sells electricity to the utility supplier.

Equation 9d presented below applies between the variables shown in table 1-1:

$$E_{p,t} - E_{s,t} = E_{DM,t} \quad \text{Equation 9d}$$

When the whole electricity demand of the industrial facility is derived as described above, the EMS 110 selects an operating point of each of the modeled tasks to minimize the cost by reflecting the modeled in-facility DERs.

For example, when the unit price is low based on the price data, the EMS 110 may manage to select an operating point which has high electricity demand for each of the modeled tasks and thus consume more resources by reflecting the modeled in-facility DERs. On the other hand, when the unit price is high based on the price data, the EMS 110 may manage the electricity demand to select an operating point which has low electricity demand for each of the modeled tasks and thus consume few resources by reflecting the modeled in-facility DERs.

As described above, the EMS 110 may manage the electricity demand of the industrial facility to minimize the energy cost caused by the operation of the industrial facility so as to satisfy the market demand by reflecting the modeled in-facility DERs. Herein, the energy cost may be derived by deducting the cost of selling resources from the cost of purchasing resources, and adding the cost of producing resources when resources are produced.

This may be expressed by Equation 10 presented below:

$$\text{Cost} = \sum_t pp_t \cdot E_{p,t} - \sum_t ps_t \cdot E_{s,t} + \sum_f p_f \cdot \sum_t CR_{f,t} + \sum_f \sum_{l,l' \in L_f} \delta_{f,l',l} \sum_t y_{f,l',l,t} \quad \text{Equation 10}$$

where $$\sum_t pp_t \cdot E_{p,t}$$

represents the cost or purchasing electricity, $pp_t$ is the unit price of purchasing electricity during time interval (t, t+1), and $E_{p,t}$ is the amount of purchased electricity.

$$\sum_t ps_t \cdot E_{s,t}$$

represents the cost of selling electricity, $ps_t$ is the unit price of selling electricity during time interval (t, t+1), and $E_{s,t}$ is the amount of sold electricity.

$$\sum_f p_f \cdot \sum_t CR_{f,t}$$

is the cost of generating the energy and $p_f$ is the price of the raw material consumed by schedulable EGS f.

Finally, $$\sum_f \sum_{l,l' \in L_f} \delta_{f,l',l} \sum_t y_{f,l',l,t}$$

represents the start-up and shut-down costs of schedulable EGS.

Figure 6:
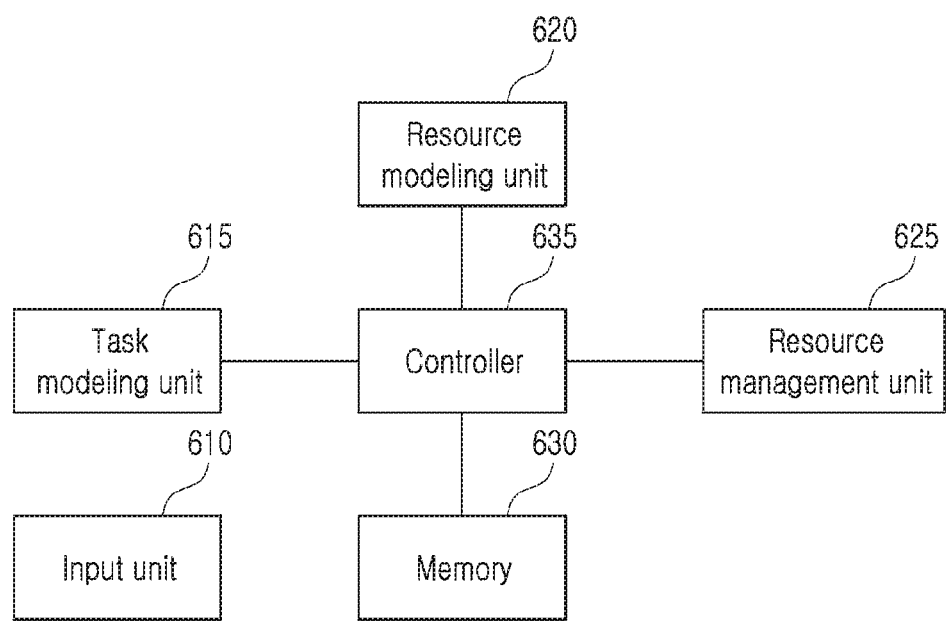
FIG. 6 is a block diagram schematically illustrating an internal configuration of an energy management system according to an exemplary embodiment of the present invention.

FIG. 6 is a block diagram schematically illustrating an internal configuration of an EMS according to an exemplary embodiment of the present invention.

Referring to FIG. 6, the EMS 110 according to an exemplary embodiment of the present invention may include an input unit 610, a task modeling unit 615, a resource modeling unit 620, a resource management unit 625, a memory 630, and a controller 635.

The input unit 610 is a means for receiving input of a variety of information for managing electricity of an industrial facility.

For example, the input unit 610 may receive input of the price data including the unit price, the state-task network (STN) of the industrial facility, operating information of the ESS and the EGS, operating information of each task, and a variety of information on each state.

The task modeling unit 615 is a means for modeling each task of the industrial facility to satisfy the market demand using the STN of the industrial facility, the operating information of each task, and a variety of information on each state, which are inputted through the input unit 610.

The task modeling unit 615 may perform modeling using the MILP which has an objective function and a series of constraints, and is configured to select an optimal operating point in a schedulable task to minimize the energy cost through the modeling.

Accordingly, the task modeling unit 615 may perform modeling to select the optimal operating point in the schedulable task so as to produce intermediate products which have high electricity demand in advance when the electricity price is low, and use the pre-produced intermediate products when the electricity price is high.

The resource modeling unit 620 is a means for modeling in-facility DERs based on the price data. The resource modeling unit 620 performs modeling with respect to the ESS and the EGS, and is configured to store energy in the ESS when the electricity price is low and use the stored energy or control the EGS to generate energy when the electricity price is high.

The resource management unit 625 is a means for managing the electricity demand of the industrial facility by selecting an operating point of each of the modeled task to minimize the cost by reflecting the modeled in-facility DERs.

The memory 630 is a means for storing a variety of information necessary for operating the EMS 110 according to an exemplary embodiment of the present invention, various data necessary for managing the electricity demand of the industrial facility, etc.

The controller 635 is a means for controlling the inner elements (for example, the input unit 610, the task modeling unit 615, the resource modeling unit 620, the resource management unit 625, the memory 630, etc.) of the EMS 110 according to an exemplary embodiment of the present invention.

The above described method and system for managing power according to exemplary embodiments of the present invention were applied to the oxygen generation plant, and the simulation results will be described.

Figure 7:
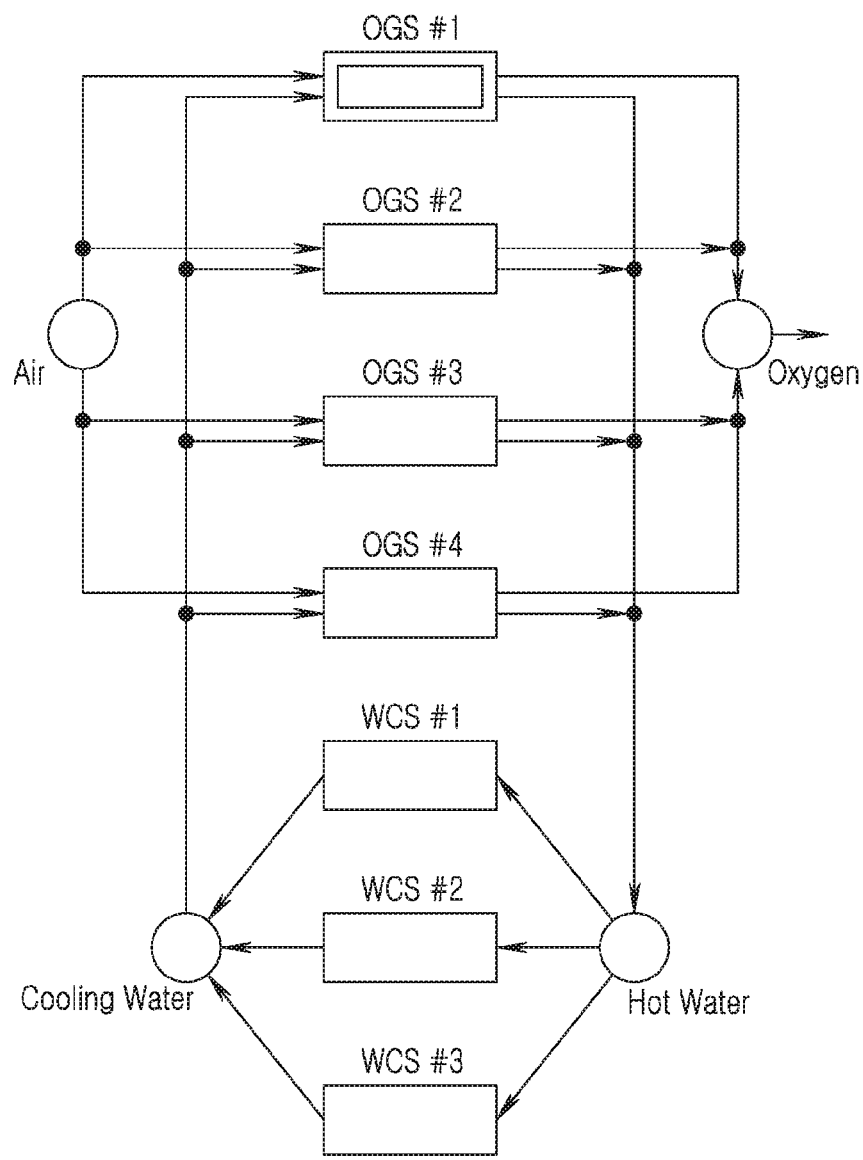
FIG. 7 is a view showing a State-Task Network (STN) of an oxygen production plant to which a power management method of the present invention is applied.

FIG. 7 shows the STN representation of the oxygen generation plant.

There are four oxygen generation systems (OGSs) producing oxygen from air. OGS #1 is assumed to be an NST with a fixed operating point, whereas the other OGSs are assumed to be STs with multiple operating points (see Table 1).

TABLE 1

| | Index of operating point, m | Production of oxygen, $pa_{i,m}$ (Nm³) | Cooling water demand, $ca_{i,m}$ (m³) | Electricity demand, $e_{i,m}$ (kWh) |
|---|---|---|---|---|
| OGS #1 | 1 | 10000 | 300 | 6000 |
| OGS #2, 3, 4 | 1 | 0 | 0 | 0 |
| | 2 | 100 | 10 | 55 |
| | 3 | 1000 | 23 | 500 |
| | 4 | 2000 | 35 | 900 |
| | 5 | 3000 | 45 | 1230 |
| | 6 | 4000 | 54 | 1520 |
| | 7 | 5000 | 62 | 1800 |
| | 8 | 6000 | 70 | 2100 |

The oxygen demand is 16000 Nm³ per hour. The lower storage bound is 2000 Nm3 and the upper storage bound is 18000 Nm³.

In addition, there are three water-cooling systems (WCSs), which are required by OGSs. All the WCSs are STs with three operating points, as shown in Table 2

TABLE 2

| | Index of operating point, m | Production of cooling water, $pa_{i,m,s}$ (m³) | Electricity demand, $e_{i,m}$ (kWh) |
|---|---|---|---|
| WCS #1, 2, 3 | 1 | 0 | 0 |
| | 2 | 100 | 28 |
| | 3 | 200 | 52 |

The demand for cooling water during each time interval is dynamic, and depends on the operating status of the OGSs. The lower storage bound is 150 m³ and the upper storage bound is 850 m³.

The maximum storage capacity of the ESS was assumed to be 6000 kWh, with a maximum charge/discharge of 1500 kWh in one time interval. The efficiency of charging and discharging was assumed to be 90%. The electricity is generated by the solar EGS (see Table 3).

TABLE 3

| Maximum storage capacity, $C_{SE}$ (kWh) | Maximum charging rate, $CH_{SE}$ (kWh) | Charging efficiency α | Maximum discharging rate, $DCH_{SE}$ (kWh) | Discharging efficiency, β |
|---|---|---|---|---|
| 6000 | 1500 | 0.9 | 1500 | 0.9 |

Figure 9:
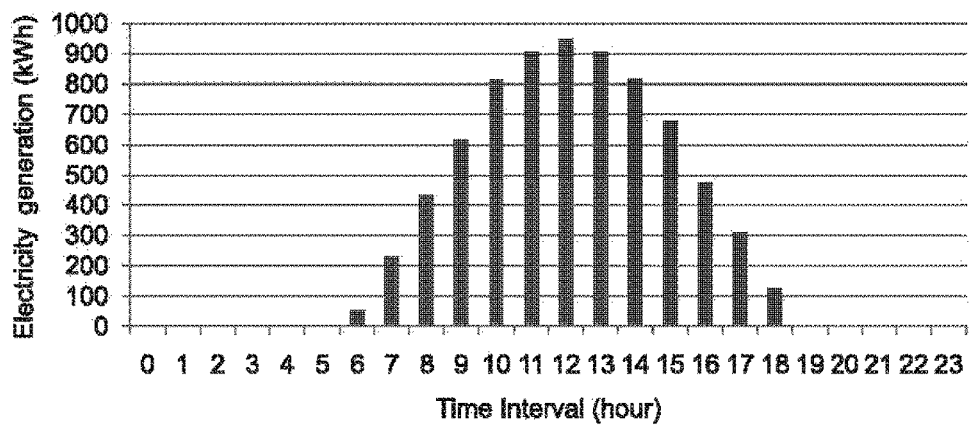
FIG. 9 shows a graph that illustrates a predicted quantity of electricity generated by a solar energy generating system during time intervals, according to an exemplary embodiment of the invention.
Figure 10:
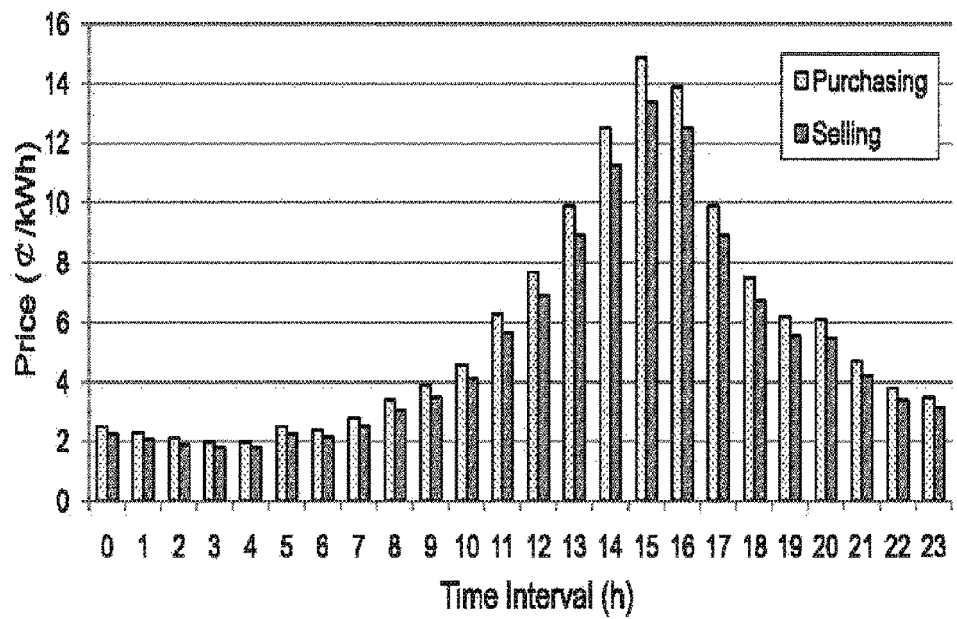
FIG. 10 shows a graph illustrating an hourly price for buying and selling electricity according to the exemplary embodiment of the invention.

FIG. 9 shows the predicted quantity of electricity generated by the solar EGS during each time interval, FIG. 10 shows the hourly price for buying and selling electricity.

FIG. 11 shows the operating points of OGS #2, 3, and 4, and WCS #1, 2, and 3 during each time interval.

Take OGS #3 as an example; it was scheduled to operate at operating point 8 during time interval 0 (from 0:00 to 1:00 a.m.), producing 6000 Nm3 of oxygen, consuming 70 m3 of cooling water, and requiring 2100 kWh of electricity (see Table 1).

Figure 12:
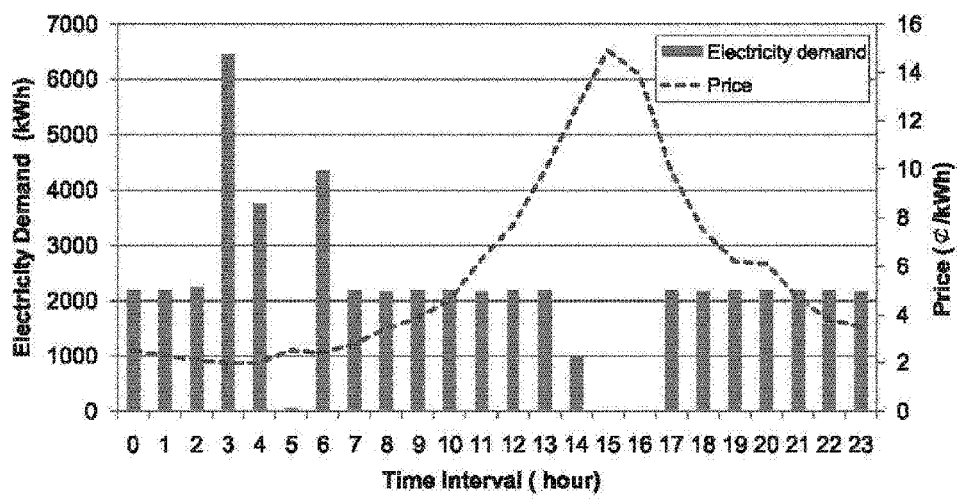
FIG. 12 shows a graph illustrating the total demand for electricity at operating points of oxygen generating systems (OGS's) and water cooling systems (WCS's) during time intervals, according to the exemplary embodiment of the invention.

FIG. 12 shows the total electricity demand of OGS #2, 3, and 4, and WCS #1, 2, and 3 during each time interval.

Figure 13:
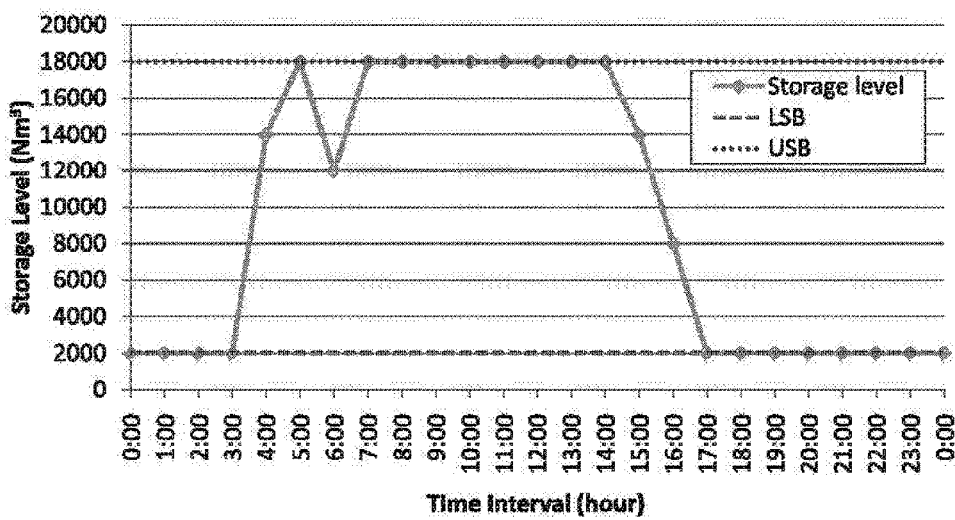
FIGS. 13 and 14 show graphs illustrating demand for electricity of oxygen generating systems and water cooling systems respectively during time intervals, according to the exemplary embodiment of the invention.
Figure 14:
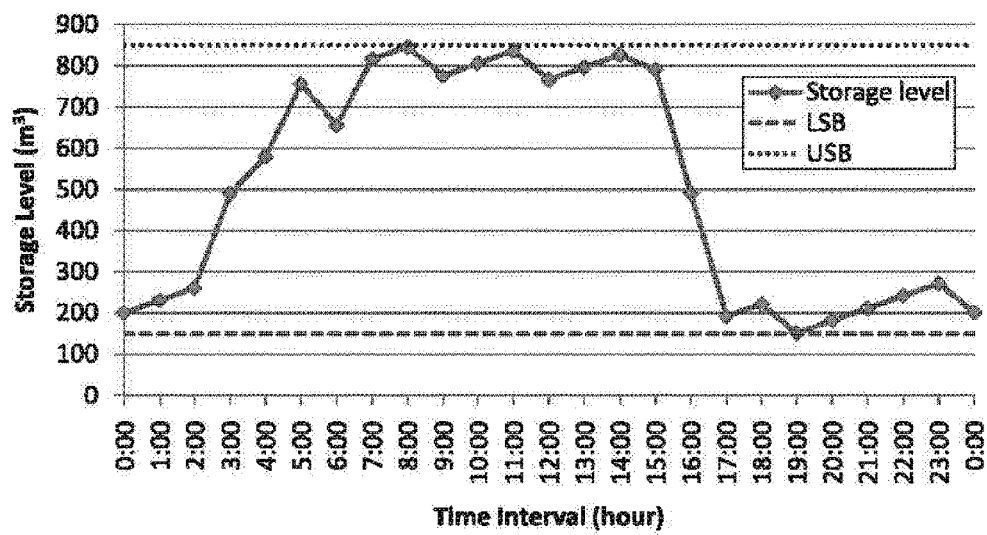

The electricity demand increased during time intervals 3, 4, and 6 when the electricity price was low. In this case, an excess of oxygen and cooling water were produced, which led to an increase in the stored oxygen and cooling water, as shown in FIGS. 13 and 14, respectively.

The electricity demand decreased during time intervals 14, 15, and 16 when the electricity price was high. During these periods, stored oxygen and cooling water were consumed (see FIGS. 13 and 14), but the quantities of stored oxygen and cooling water did not exceed the storage bounds.

From FIG. 12, we can see that the electricity price during time interval 5 was low, but demand did not increase. This is because the amount of stored oxygen and cooling water was close to the upper storage bound, and the electricity price during time interval 6 was lower than that in time interval 5; therefore, it was cheaper to shift demand to time interval 6.

Figure 15:
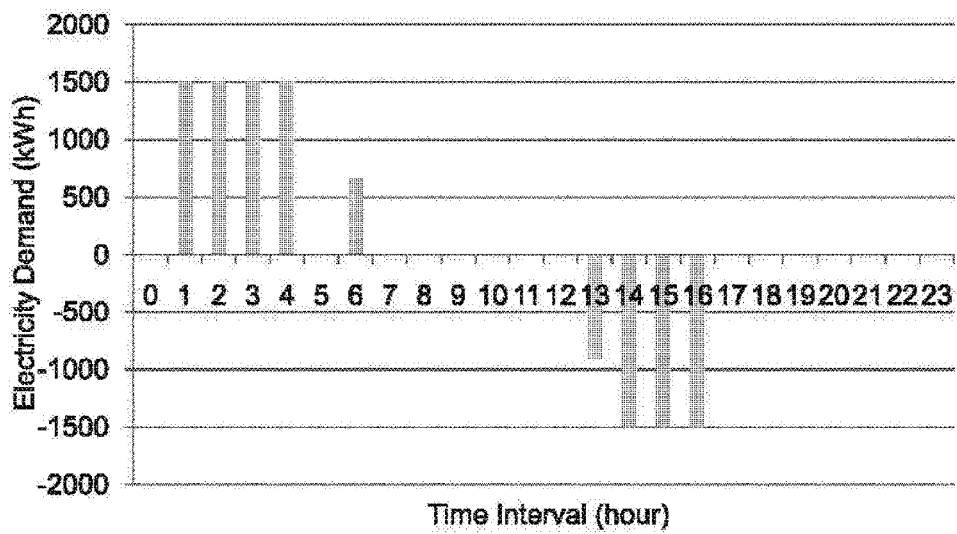
FIG. 15 shows a graph illustrating the demand for electricity for an energy generating system during time intervals, according to the exemplary embodiment of the invention.

FIG. 15 shows the electricity demand due to the ESS during each time interval.

Positive values indicate charging and negative values indicate discharging. The ESS charged during time intervals in which the electricity prices were lower and discharged when the electricity prices were higher.

During each time interval, the maximum amount of electricity charged/discharged by the ESS was 1500 kWh, limited by the maximum charge/discharge rate (see Table 3). The ESS reached its maximum storage capacity, which was 6000 kWh, during time interval 6, and completely discharged all of its energy in time interval 16. The total discharged electricity was less than the total charged electricity because of the energy lost during charging and discharging.

Figure 16:
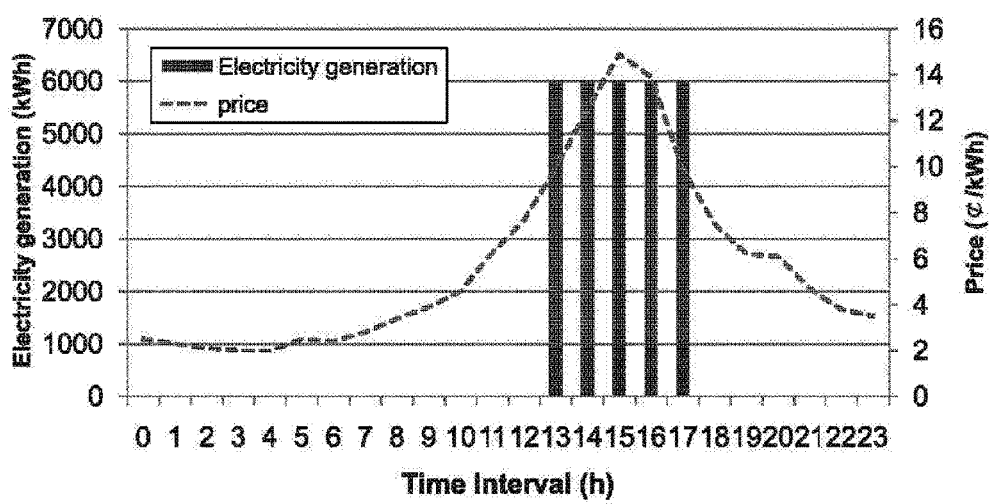
FIG. 16 shows a graph of the electricity generated by a schedulable energy generating system during each time interval, according to the exemplary embodiment of the invention.

FIG. 16 shows the electricity generated by schedulable EGS during each time interval.

The schedulable EGS generated electricity during time intervals 13 to 17, in which the electricity prices became high, and reduced the electricity demand in peak periods.

Figure 17:
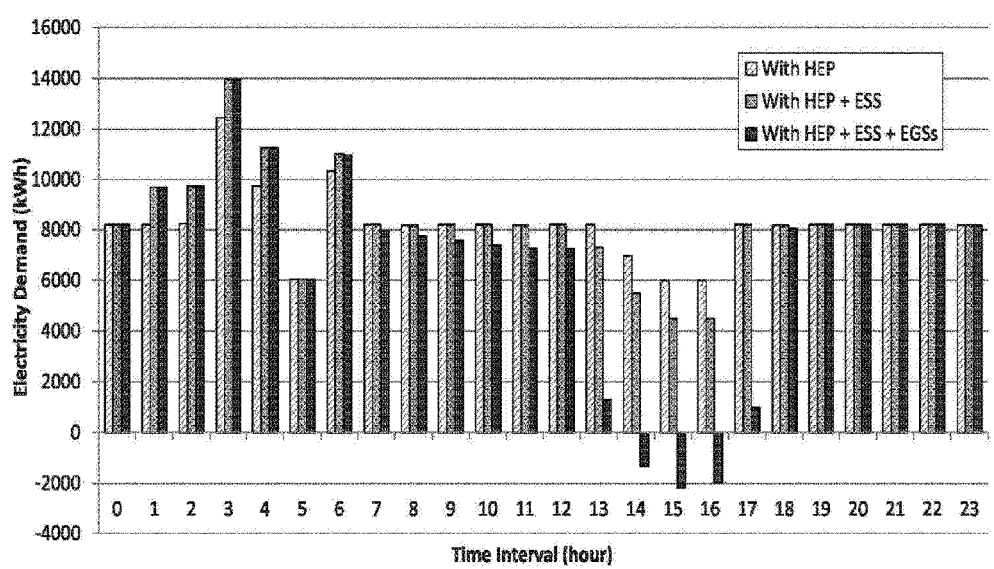
FIG. 17 shows the total electricity demand of the industrial facilities during each time interval, according to the exemplary embodiment of the invention.

FIG. 17 shows the total electricity demand of the industrial facilities during each time interval.

Case (a) shows the demand with day-ahead hourly electricity prices while case (b) shows the demand with the inclusion of the ESS. During time intervals 1, 2, 3, 4, and 6, the inclusion of the ESS led to an increase in the demand because the ESS charged when prices were low, whereas the total electricity demands during time intervals 13, 14, 15, and 16 decreased because the ESS discharged when prices were high.

Case (c) shows the total electricity demand with hourly electricity prices, the ESS, and the EGSs. The electricity demand was further decreased because the solar EGS generated electricity during time intervals 6 to 18 and the schedulable EGS generated electricity during time intervals 13 to 17. The electricity demand was negative during time intervals 14 to 16, which indicates that the facilities sold surplus electricity to the grid to make a profit.

Hourly electricity pricing enabled a reduction in the energy costs by shifting the schedulable tasks (OGS #2, 3, and 4, and WCS #1, 2, and 3) from high-price time intervals to low-price time intervals; the ESS reduced energy costs because it stored electricity when prices were low for use when prices were high; and the EGS reduced energy costs by generating additional electricity with lower cost.

Table 4 shows the total energy cost for different cases.

As shown in Table 4, the total energy cost is $10842.0 in case of fixed price (average of the dynamic price), $105946.6 in case of hourly electricity price, $10028 in case of hourly electricity price with ESS, and $8695.4 in case of hourly electricity price with ESS and EGSs, which indicates that the energy cost was reduced.

TABLE 4

| | Fixed price | Hourly electricity price | Hourly electricity price with ESS | Hourly electricity price with ESS and EGSs |
|---|---|---|---|---|
| Cost($) | 10842.0 | 10594.6 | 10028 | 8695.4 |

The electricity distributing method according to exemplary embodiments of the present invention may be implemented in the form of program commands which are performed through various electronically information processing means, and may be recorded on a storage medium. The storage medium may include program commands, data files, and data structures either alone or in combination.

The program commands recorded on the storage medium may be those that are especially designed and configured for the present invention, or may be those that are publicly known and available to those skilled in the art. Examples of the storage medium include magnetic media such as hard disks, floppy disks and magnetic tapes, optical media such as CD-ROMs and DVDs, magneto-optical media such as floptical disks, and hardware devices such as ROMs, RAMs and flash memories that are especially configured to store and execute program commands. Examples of the program commands include machine language codes created by a compiler, and high-level language codes that can be executed by an electronically information processing device, for example, a computer, by using an interpreter.

The above-described hardware device may be configured to operate as one or more software modules to perform the operations according to various exemplary embodiments, and vice versa.

While the invention has been shown and described with reference to certain preferred embodiments thereof, it will be understood by those skilled in the art that various changes in form and details may be made therein without departing from the spirit and scope of the invention as defined by the appended claims.

INDUSTRIAL APPLICABILITY

The method for managing power according to the present invention can be utilized in the smart grid system field and can be effectively used for the demand of industrial facilities.

The invention claimed is:

1. A method for managing power in an energy management system to manage an electricity demand of a production process in an industrial facility supplied with power from a utility, comprising:
   calculating in-facility distributed energy resources (DERs) based on price data provided by the utility in each time interval; and
   modeling a task of the production process in the industrial facility so as to minimize an energy cost by reflecting the calculated in-facility DERs,
   wherein the task is a processing operation which is performed in the production process,
   wherein the modeling a task of the production process is performed based on a constraint for storage balance in each state of a state-task network (STN), such that the storage of each state is not less than a minimum value or is not greater than a maximum value, and the electricity demand in each time interval is increased or reduced regardless of price data when the storage of each state comes close to or reaches the minimum value or the maximum value.

2. The method of claim 1, wherein the task comprises a non-schedulable task in which the electricity demand is not scheduled, and a schedulable task in which the electricity demand is scheduled.

3. The method of claim 2, wherein the schedulable task comprises a plurality of operating points, and
   wherein the plurality of operating points are detailed processing operations which are set by taking into consideration a consumption material which is consumed in the schedulable task, and a production material which is outputted from the schedulable task, and electricity demands on the plurality of operating points are different from one another.

4. The method of claim 3, wherein the modeling the task comprises modeling to select an operating point of the schedulable task such that the electricity demand of the schedulable task increases when the price data is low and the electricity demand of the schedulable task is reduced when the price data is high.

5. The method of claim 1, wherein the calculating the in-facility DERs comprises:

calculating first in-facility DERs which are charged or discharged in an energy storage system; and calculating second in-facility DERs which are produced by an energy generation system.

6. The method of claim 5, wherein the calculating the in-facility DERs comprises, when a unit price is low based on the price data, storing electricity in the energy storage system, and, when the unit price is high, discharging the electricity stored in the energy storage system.

7. The method of claim 5, wherein the energy generation system comprises a non-schedulable energy generation system which is not able to schedule electricity production, and a schedulable energy generation system which is able to schedule electricity production.

8. The method of claim 7, wherein the calculating the in-facility DERs comprises predicting electricity which is generated by the schedulable energy generation system based on previous records, and calculating electricity which is generated by the schedulable energy generation system based on the price data.

9. The method of claim 8, wherein the electricity generated by the schedulable energy generation system is calculated by further considering an electricity production cost of the schedulable energy generation system.

10. The method of claim 1, wherein the energy cost is derived by deducting a cost of selling the in-facility DERs from a cost of purchasing the in-facility DERs, and adding a cost of producing resources when the in-facility DERs comprise production resources.

11. A recording medium product which records a program code for performing the method according to claim 1.

* * * * *